(12) United States Patent
Smith

(10) Patent No.: US 8,095,980 B2
(45) Date of Patent: Jan. 10, 2012

(54) DETECTING MALICIOUS BEHAVIOR IN DATA TRANSMISSION OF A DE-DUPLICATION SYSTEM

(75) Inventor: Mark Andrew Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 12/113,145

(22) Filed: Apr. 30, 2008

(65) Prior Publication Data

US 2009/0276851 A1 Nov. 5, 2009

(51) Int. Cl.
*G06F 21/00* (2006.01)
*G06F 21/20* (2006.01)
*G06F 21/22* (2006.01)

(52) U.S. Cl. ................. 726/22; 726/23; 726/25

(58) Field of Classification Search ............. 726/22–25
See application file for complete search history.

(56) References Cited

U.S. PATENT DOCUMENTS

| 2005/0022009 | A1* | 1/2005 | Aguilera et al. ............ 713/201 |
| 2006/0041562 | A1 | 2/2006 | Paczkowski et al. |
| 2006/0069717 | A1 | 3/2006 | Mamou et al. |
| 2006/0253440 | A1* | 11/2006 | Reed et al. ................... 707/7 |
| 2007/0208838 | A1 | 9/2007 | Balasubramaniam Chandra |

OTHER PUBLICATIONS

J. Mirkovic, S. Dietrich, D. Dittrich, and P. Relher, Internet Denial of Service: Attack and Defense Mechanisms, Prentice Hall, 2005, 21 pages.*
A. Muthitachareon, B. Chen, D. Mazieres, "A Low-bandwidth Network File System," Proceedings of the Eighteenth ACM Symposium on Operating Systems Principles, Dec. 2001, 14 pages.*

* cited by examiner

*Primary Examiner* — Carl Colin
*Assistant Examiner* — John Elmore
(74) *Attorney, Agent, or Firm* — Leonard T. Guzman; Mohammed Kashef

(57) ABSTRACT

The present invention provides a method and system of detecting malicious behavior in a series of data transmission de-duplication requests of a de-duplicated computer system. In an exemplary embodiment, the method and system include, (1) if the series includes at least one particular de-duplication request for particular data and a reply to the particular request that the system does not have the particular data, processing at least one subsequent response and (2) determining the existence of the behavior from the at least one subsequent response.

8 Claims, 8 Drawing Sheets

DETECTING MALICIOUS BEHAVIOR IN DATA TRANSMISSION OF A DE-DUPLICATION SYSTEM

FIELD OF THE INVENTION

The present invention relates to computer systems, and particularly relates to a method and system of detecting malicious behavior in a series of data transmission de-duplication requests of a de-duplicated computer system.

BACKGROUND OF THE INVENTION

1. Problems with De-Duplication of Data Transmission

In network storage systems which employ de-duplication of data transmission, there exists a security concern. Generally in these systems, the storage system contains a set of files or file pieces and has these files indexed by content (e.g., with a Secure Hash Algorithm (i.e., SHA-1) hash). Clients of such a system can eliminate the transfer over the network of files or file pieces which already exist in the system by first querying the system whether the content identifier (i.e., a SHA-1 hash) for each particular data piece exists, and only sending the pieces of data which the storage system does not already have. The storage system can read out of its own storage the duplicate pieces of data referred to by the client instead of requiring the client to send them over the network.

The security concern lies in the fact that clients of the system can "byte twiddle" to produce likely matches to files on the storage system, and, thereby deduce from the storage system's response to transmission de-duplication requests whether the file or the piece of the file already exists on the system. For example, if a system stored slightly modified form letters for employees of a company describing the employees' bonuses for a year, a malicious client, "Bob", of the system could (i) take his form letter and change the name on the letter from "Bob" to "Alice", (ii) change the bonus from $10 to $11, and (iii) ask the storage system if such a file already exists in the system. If so, Bob would have discovered Alice's bonus. If not, Bob could try $12 dollars and so on until the bonus is discovered.

2. Prior Art Systems

Referring to FIG. 1, a prior art system for addressing this security concern is to store access information in the storage system for each of the pieces of data. Before the storage system responds to the client that it already has a particular piece of data, the system first checks to make sure that the client has sufficient permission (i.e., read permission) to the data in question. For whole-file network de-duplication, this can be done through an Access Control List (ACL) check before responding to the client. For sub-file de-duplication systems, it is more difficult because each of the data pieces is not associated with a particular ACL, and each data piece may be part of many different files. In that case, the storage system must store a member list for each of the file pieces to determine which files it is part of. Then, the storage system must check each of the ACLs for the member files to find at least one which grants sufficient permission (i.e., read permission). This method requires the maintenance of a list of members for each piece of data, and results in a slower de-duplication process because so many ACLs must be checked.

Thus, there is a need to eliminate the need for storing file member information for each file piece and to eliminate the need to check ACLs for de-duplication hits. Therefore, a method and system of detecting malicious behavior in a series of data transmission de-duplication requests of a de-duplicated computer system is needed.

SUMMARY OF THE INVENTION

The present invention provides a method and system of detecting malicious behavior in a series of data transmission de-duplication requests of a de-duplicated computer system. In an exemplary embodiment, the method and system include, (1) if the series includes at least one particular de-duplication request for particular data and a reply to the particular request that the system does not have the particular data, processing at least one subsequent response and (2) determining the existence of the behavior from the at least one subsequent response.

In an exemplary embodiment, the processing includes receiving at least one subsequent de-duplication request after not receiving any data before the receiving. In an exemplary embodiment, the processing includes receiving at least one piece of data where the received data does not correspond to the particular data. In a specific embodiment, the determining includes recognizing a discrepancy between the data identifier in the particular request and the data identifier of the received data.

In an exemplary embodiment, the processing includes (a) receiving the particular data, (b) receiving at least one subsequent de-duplication request for other data that the system does not have, (c) sending a reply to the subsequent request that the system does not have the other data, and (d) receiving at least one subsequent response wherein the response comprises the other data. In a specific embodiment, the determining includes recognizing that the difference between the received particular data and the other data is small.

The present invention also provides a computer program product usable with a programmable computer having readable program code embodied therein of detecting malicious behavior in a series of data transmission de-duplication requests of a de-duplicated computer system. In an exemplary embodiment, the computer program product includes (1) computer readable code for, if the series comprises at least one particular de-duplication request for particular data and a reply to the particular request that the system does not have the particular data, processing at least one subsequent response and (2) computer readable code for determining the existence of the behavior from the at least one subsequent response.

In an exemplary embodiment, the computer readable code for processing includes computer readable code for receiving at least one subsequent de-duplication request after not receiving any data before the receiving. In an exemplary embodiment, the computer readable code for processing includes computer readable code for receiving at least one piece of data where the received data does not correspond to the particular data. In a specific embodiment, the computer readable code for determining includes computer readable code for recognizing a discrepancy between the data identifier in the particular request and the data identifier of the received data.

In an exemplary embodiment, the computer readable code for processing includes (a) computer readable code for receiving the particular data, (b) computer readable code for receiving at least one subsequent de-duplication request for other data that the system does not have, (c) computer readable code for sending a reply to the subsequent request that the system does not have the other data, and (d) computer readable code for receiving at least one subsequent response wherein the response comprises the other data. In a specific embodiment, the computer readable code for determining includes computer readable code for recognizing that the difference between the received particular data and the other data is small.

THE FIGURES

DETAILED DESCRIPTION OF THE INVENTION

The present invention provides a method and system of detecting malicious behavior in a series of data transmission de-duplication requests of a de-duplicated computer system. In an exemplary embodiment, the method and system include, (1) if the series includes at least one particular de-duplication request for particular data and a reply to the particular request that the system does not have the particular data, processing at least one subsequent response and (2) determining the existence of the behavior from the at least one subsequent response.

Figure 1:
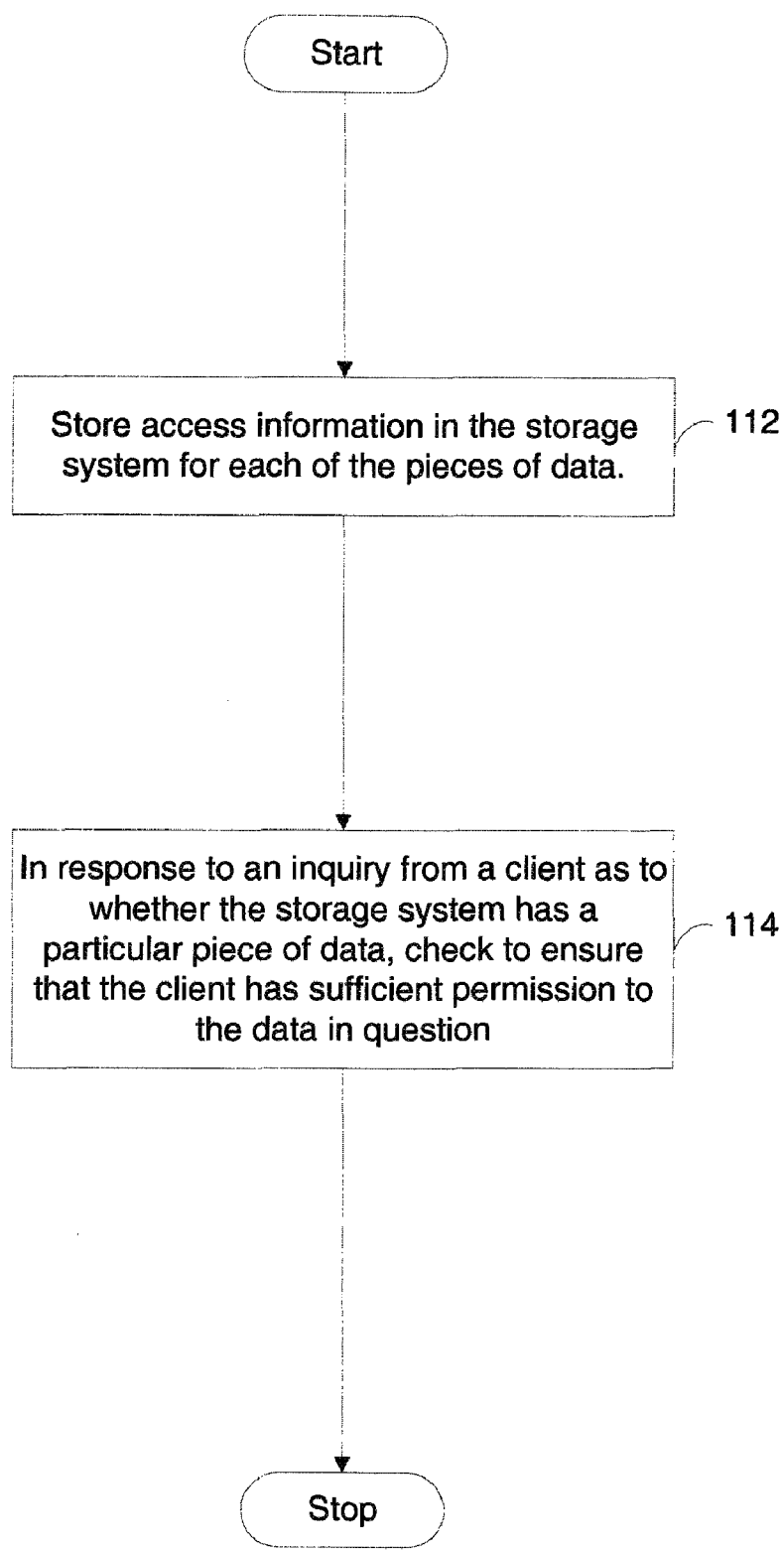
FIG. 1 is a flowchart of a prior art technique.
Figure 2A:
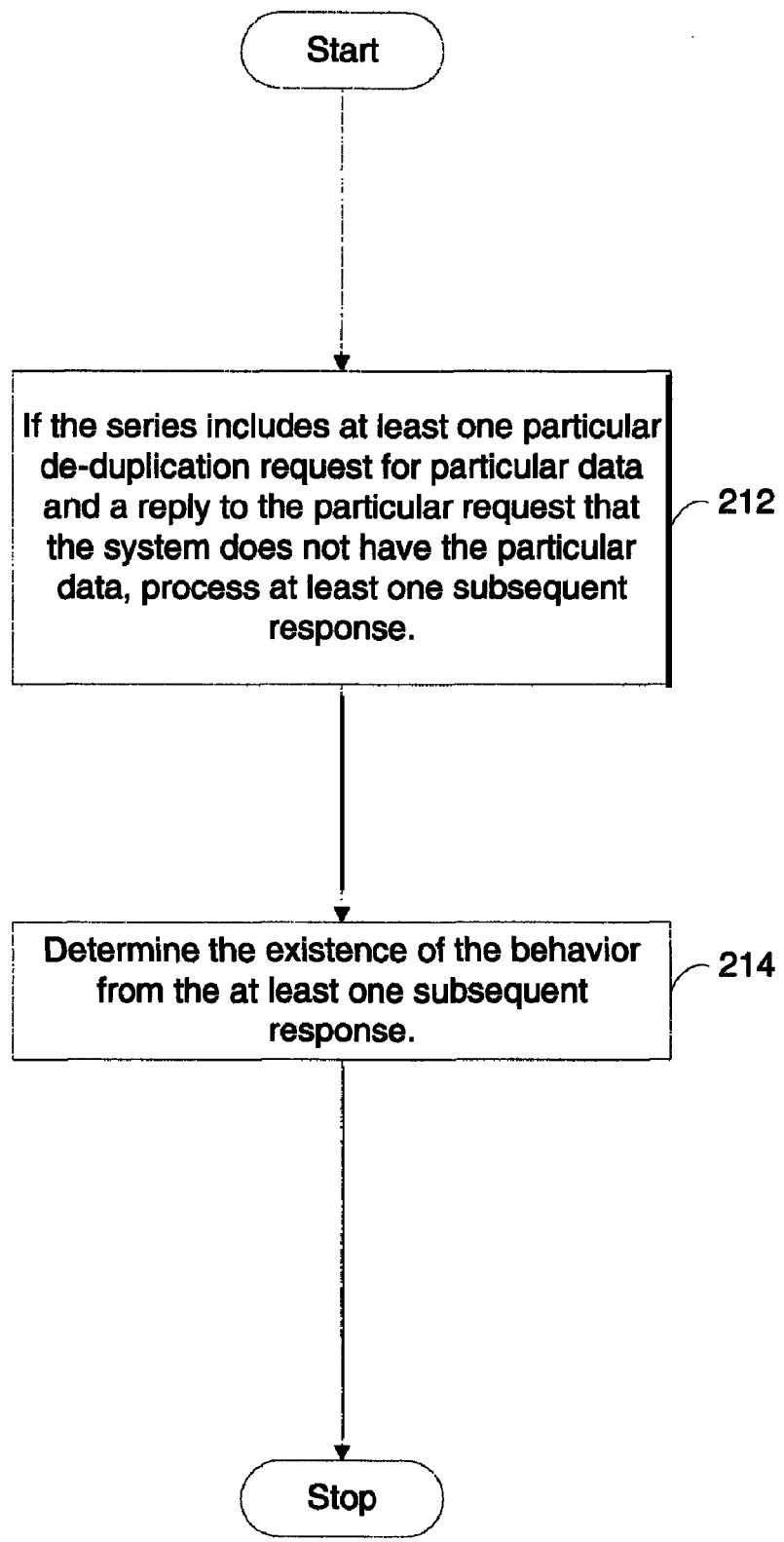
FIG. 2A is a flowchart in accordance with an exemplary embodiment of the present invention.
Figure 2B:
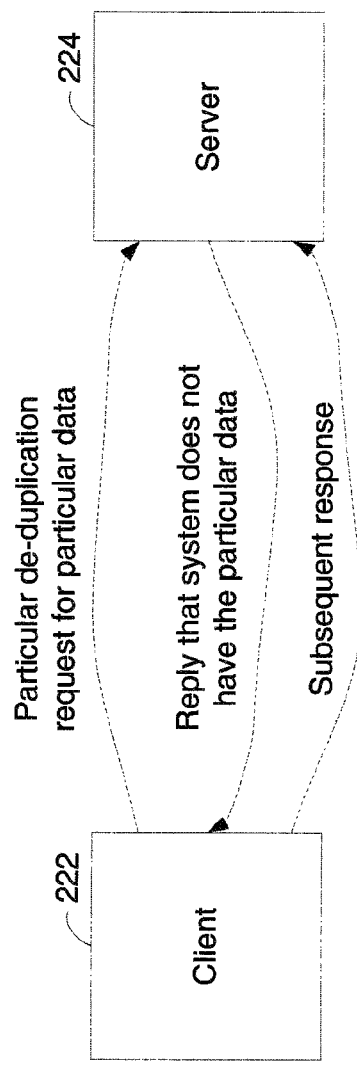
FIG. 2B is a diagram in accordance with an exemplary embodiment of the present invention.

Referring to FIG. 2A, in an exemplary embodiment, the present invention includes a step 212 of, if the series includes at least one particular de-duplication request for particular data and a reply to the particular request that the system does not have the particular data, processing at least one subsequent response and step 214 of determining the existence of the behavior from the at least one subsequent response. Referring to FIG. 2B, a client 222 sends at least one particular de-duplication request for particular data to a server 224, server 224 sends a reply to the particular request that the system does not have the particular data, and client 222 sends at least one subsequent response to server 224. In an exemplary embodiment, the present invention, via step 214, determines the existence of the malicious behavior from the at least one subsequent response.

Traffic Heuristic #1

Figure 3:
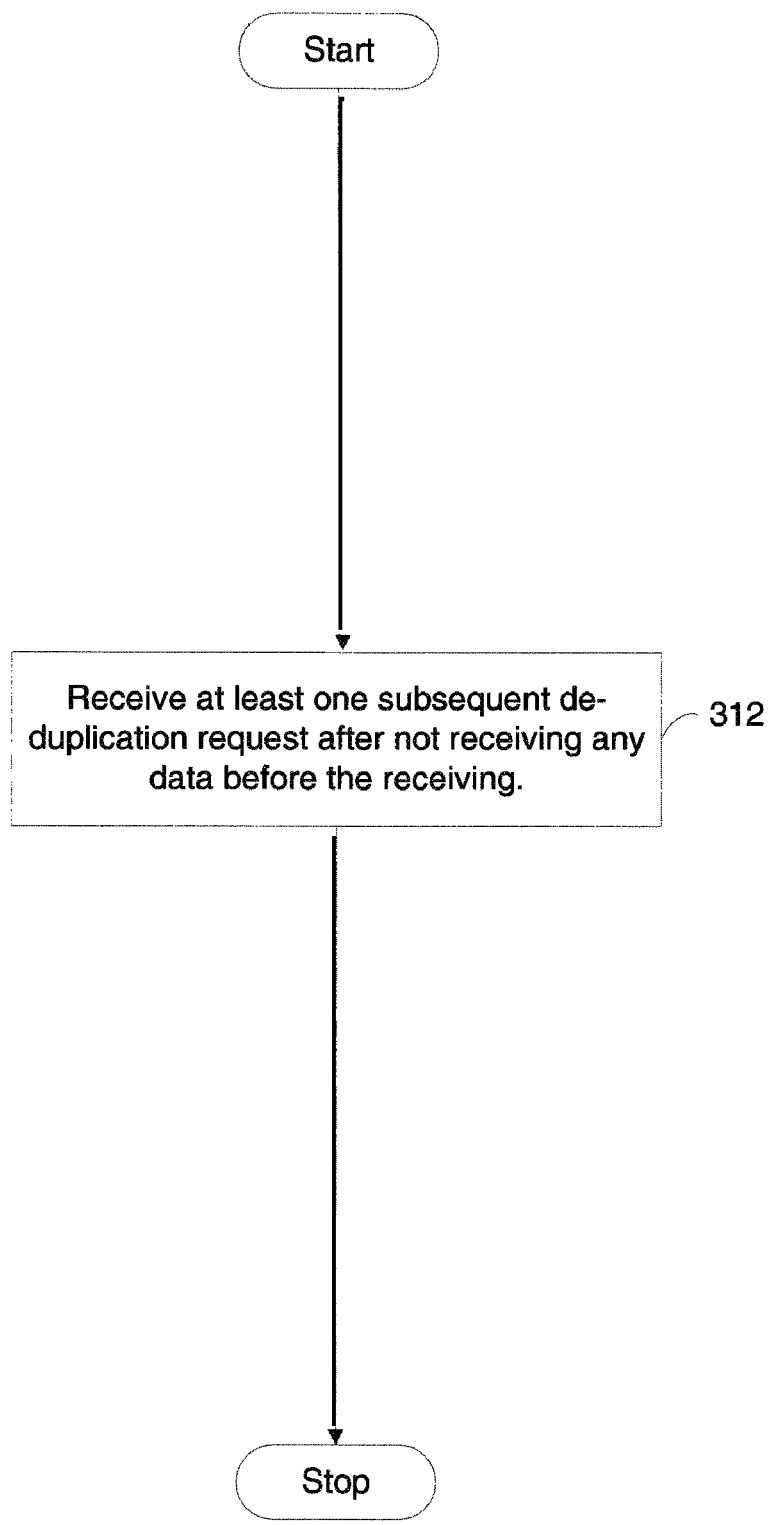
FIG. 3 is a flowchart of the processing step in accordance with an exemplary embodiment of the present invention.

Referring to FIG. 3, in an exemplary embodiment, processing step 212 includes a step 312 of receiving at least one subsequent de-duplication request after not receiving any data before the receiving. As an example of Heuristic #1, if client 222 client repeatedly were to ask server 224 whether server 224 contains particular data identifiers, if server 224 repeatedly does not contain the particular data, and if client 222 does not send the complementary data to server 224 between de-duplication requests but only sends de-duplication requests, then the present invention would determine malicious behavior from client 222's behavior.

Traffic Heuristic #2

Figure 4A:
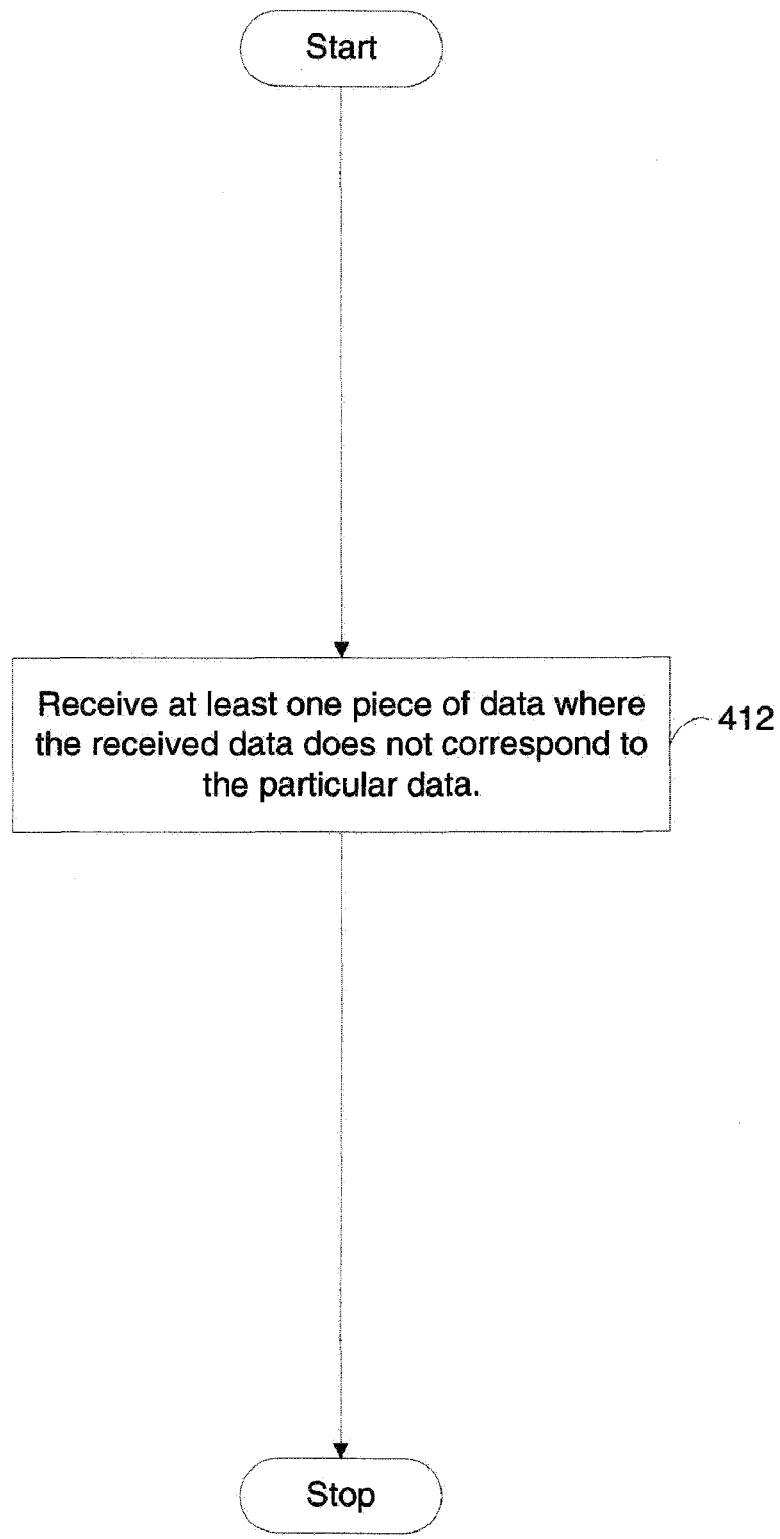
FIG. 4A is a flowchart of the processing step in accordance with an exemplary embodiment of the present invention.
Figure 4B:
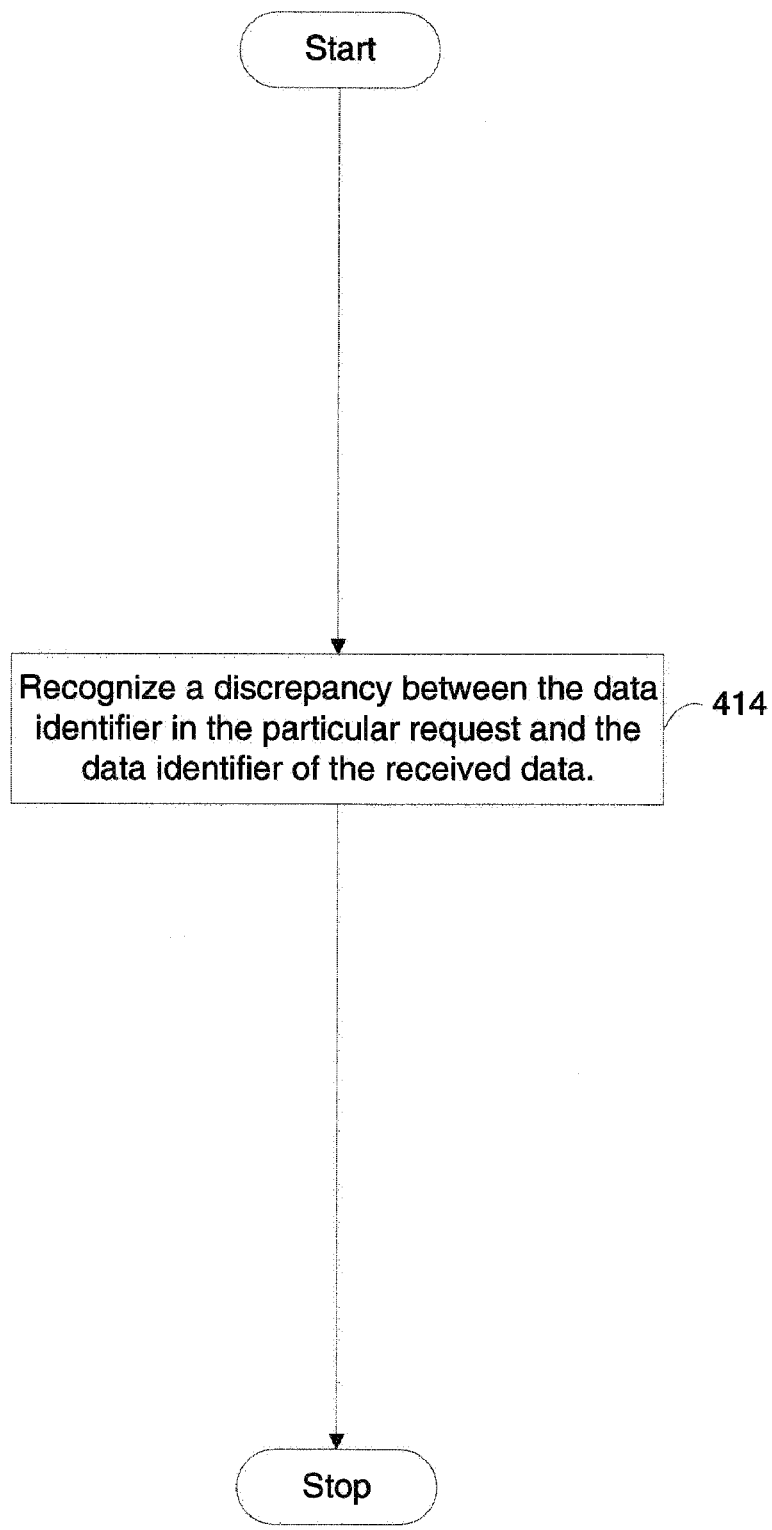
FIG. 4B is a flowchart of the determining step in accordance with a specific embodiment of the present invention.

Referring to FIG. 4A, in an exemplary embodiment, processing step 212 includes a step 412 of receiving at least one piece of data where the received data does not correspond to the particular data. Referring to FIG. 4B, in a specific embodiment, determining step 214 includes a step 414 of recognizing a discrepancy between the data identifier in the particular request and the data identifier of the received data. In an exemplary embodiment, the data identifier of data is a hash of the data. Thus, in a particular embodiment, the recognizing includes recognizing that the hash of the received data does not equal the hash in the particular request, where the hash in the particular request is the hash of the particular data.

As an example of Heuristic #2, if client 222 were to repeatedly ask server 224 whether server 224 contains particular data identifiers, if server 224 repeatedly does not contain the particular data, and if client 222 sends data to server 224 between de-duplication requests, where the sent data include very small pieces of data between failed de-duplication requests in order to mask client 222's behavior and save the time of sending the actual data used to produce the particular data identifiers which describe the data, the present invention could detect the malicious behavior from the discrepancy between the data identifier used for the de-duplication request and the data identifier computed from the transmitted data.

Traffic Heuristic #3

Figure 5A:
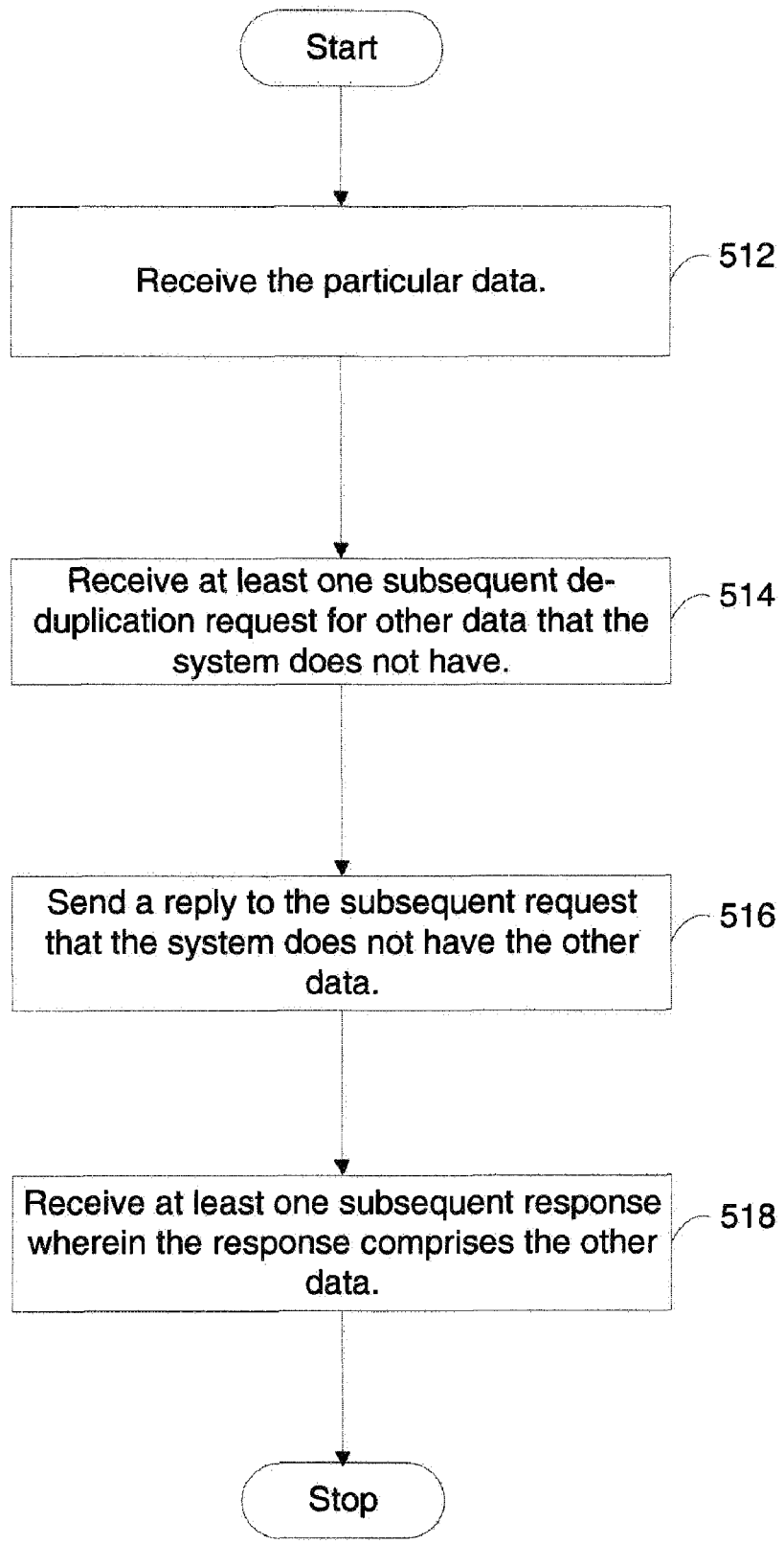
FIG. 5A is a flowchart of the processing step in accordance with an exemplary embodiment of the present invention.
Figure 5B:
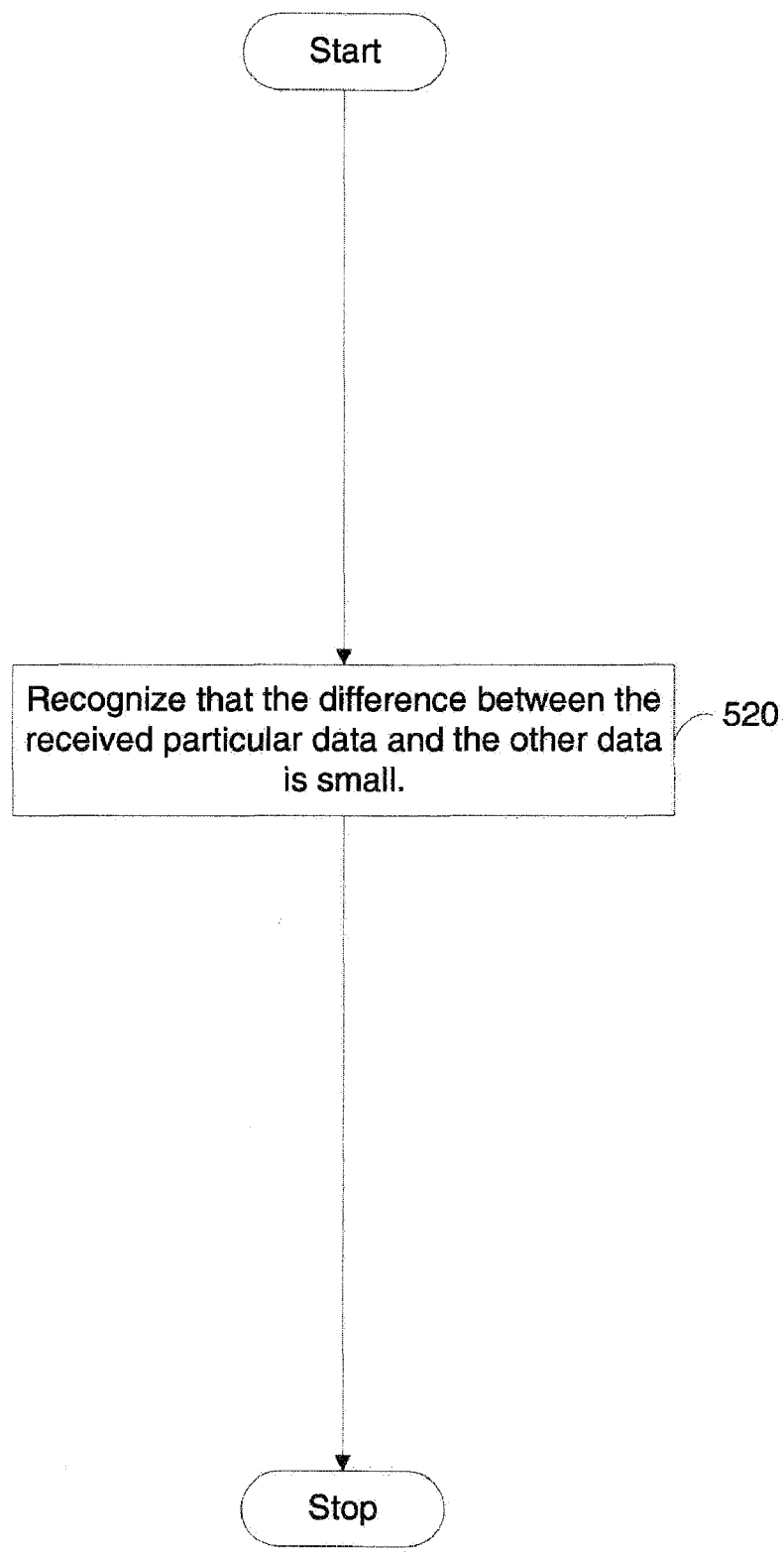
FIG. 5B is a flowchart of the determining step in accordance with a specific embodiment of the present invention.

Referring to FIG. 5A, in an exemplary embodiment, processing step 212 includes a step 512 of receiving the particular data, a step 514 of receiving at least one subsequent de-duplication request for other data that the system does not have, a step 516 of sending a reply to the subsequent request that the system does not have the other data, and a step 518 of receiving at least one subsequent response wherein the response comprises the other data. Referring to FIG. 5B, in a specific embodiment, determining step 214 includes a step 520 of recognizing that the difference between the received particular data and the other data is small. In an exemplary embodiment, the difference would be small if the difference were less than 64 bytes.

As an example of Heuristic #3, if client 222 were to repeatedly ask server 224 whether server 224 contains particular data identifiers, if server 224 repeatedly does not contain the particular data, and if client 222 sends data to server 224 between de-duplication requests, where the sent data is consistent with the identifiers client 222 computed from the data in order to mask client 222's behavior, the present invention could detect the malicious behavior because the network traffic would be suspicious. Specifically, the present invention could detect that the difference/change between the sequential data that client 222 is sending is very small between de-duplication requests such that the series of differences between sequentially sent byte streams would reveal the malicious behavior.

General

The present invention can take the form of an entirely hardware embodiment, an entirely software embodiment, or an embodiment containing both hardware and software elements. In an exemplary embodiment, the present invention is implemented in software, which includes but is not limited to firmware, resident software, and microcode.

Furthermore, the present invention can take the form of a computer program product accessible from a computer-usable or computer-readable medium providing program code for use by or in connection with a computer system or any instruction execution system. The computer program product includes the instructions that implement the method of the present invention. A computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A computer system suitable for storing and/or executing program code includes at least one processor coupled directly or indirectly to memory elements through a system bus. The memory elements include local memory employed during actual execution of the program code, bulk storage, and cache memories that provide temporary storage of at least some program code to reduce the number of times code is retrieved from bulk storage during execution. Input/output (I/O) devices (including but not limited to keyboards, displays, pointing devices, etc.) can be coupled to the computer system either directly or through intervening I/O controllers. Network adapters may also be coupled to the computer system in order to enable the computer system to become coupled to other computer systems or remote printers or storage devices through intervening private or public networks. Modems, cable modems, and Ethernet cards are just a few of the currently available types of network adapters. The computer system can also include an operating system and a compute file-system.

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of detecting malicious behavior in a series of data transmission de-duplication requests of a de-duplicated computer system, the method comprising:
    if the series comprises at least one particular de-duplication request for particular data and a reply to the particular request that the system does not have the particular data, processing at least one subsequent response, wherein the processing comprises receiving at least one piece of data wherein the received data does not correspond to the particular data; and
    determining the existence of the behavior from the at least one subsequent response, wherein the determining comprises recognizing a discrepancy between a data identifier in the particular request and a data identifier of the received data.

2. The method of claim 1 wherein the processing comprises receiving at least one subsequent de-duplication request after not receiving any data before the receiving.

3. The method of claim 1 wherein the processing comprises:
    receiving the particular data;
    receiving at least one subsequent de-duplication request for other data that the system does not have;
    sending a reply to the subsequent request that the system does not have the other data; and
    receiving at least one subsequent response wherein the response comprises the other data.

4. The method of claim 3 wherein the determining comprises recognizing that the difference between the received particular data and the other data is small.

5. A non-transitory computer program product usable with a programmable computer having readable program code embodied therein of detecting malicious behavior in a series of data transmission de-duplication requests of a de-duplicated computer system, the computer program product comprising:
    computer readable code for, if the series comprises at least one particular de-duplication request for particular data and a reply to the particular request that the system does not have the particular data, processing at least one subsequent response, wherein the processing comprises receiving at least one piece of data wherein the received data does not correspond to the particular data; and
    computer readable code for determining the existence of the behavior from the at least one subsequent response.
    wherein the determining comprises recognizing a discrepancy between a data identifier in the particular request and a data identifier of the received data.

6. The computer program product of claim 5 wherein the computer readable code for processing comprises computer readable code for receiving at least one subsequent de-duplication request after not receiving any data before the receiving.

7. The computer program product of claim 5 wherein the computer readable code for processing comprises:
    computer readable code for receiving the particular data;
    computer readable code for receiving at least one subsequent de-duplication request for other data that the system does not have;
    computer readable code for sending a reply to the subsequent request that the system does not have the other data; and
    computer readable code for receiving at least one subsequent response wherein the response comprises the other data.

8. The computer program product of claim 7 wherein the computer readable code for determining comprises computer readable code for recognizing that the difference between the received particular data and the other data is small.

* * * * *